US 6,655,726 B2

(12) United States Patent
Bergeron

(10) Patent No.: US 6,655,726 B2
(45) Date of Patent: Dec. 2, 2003

(54) EASY TARP AND DRY LOAD

(76) Inventor: Rock Bergeron, 610 Boulevard St Joseph, Québec City, Quebec (CA), G2K 1W5

( * ) Notice: Subject to any disclaimer, the term of this patent is extended or adjusted under 35 U.S.C. 154(b) by 0 days.

(21) Appl. No.: 10/154,243

(22) Filed: May 22, 2002

(65) Prior Publication Data

US 2003/0047959 A1 Mar. 13, 2003

(30) Foreign Application Priority Data

May 22, 2001 (CA) .............................................. 2349049

(51) Int. Cl.⁷ ................................................ B60P 7/02
(52) U.S. Cl. ............................ 296/100.11; 296/100.01; 296/26.04
(58) Field of Search ..................... 296/100.01, 100.11, 296/98, 26.04, 26.05, 36, 43, 181, 26.08, 26.09, 26.12, 26.13

(56) References Cited

U.S. PATENT DOCUMENTS

| | | | | |
|---|---|---|---|---|
| 3,140,116 A | * | 7/1964 | Speas ....................... | 296/26.05 |
| 4,023,857 A | | 5/1977 | Killion | |
| 4,585,264 A | * | 4/1986 | Miller ...................... | 296/26.04 |
| 4,968,085 A | * | 11/1990 | Stann .......................... | 296/98 |
| 5,088,785 A | * | 2/1992 | Lee .......................... | 296/26.05 |
| 5,524,953 A | | 6/1996 | Shaer | |
| 5,690,377 A | | 11/1997 | Denyer | |
| 5,713,712 A | * | 2/1998 | McIntyre ............... | 296/100.11 |
| 5,887,932 A | * | 3/1999 | Pier, II. ........................ | 296/43 |
| 5,890,757 A | * | 4/1999 | Masterson et al. .......... | 296/181 |
| 5,938,270 A | * | 8/1999 | Swanson et al. ....... | 296/100.11 |
| 5,988,732 A | | 11/1999 | Schouten | |
| 6,142,553 A | * | 11/2000 | Bodecker ............... | 296/100.11 |
| 6,183,036 B1 | * | 2/2001 | Coulson ..................... | 296/181 |
| 6,196,604 B1 | * | 3/2001 | Hoh et al. ................ | 296/26.05 |
| 6,447,038 B1 | * | 9/2002 | Davis et al. ............. | 296/26.05 |

* cited by examiner

*Primary Examiner*—D Glenn Dayoan
*Assistant Examiner*—Lori L. Coletta

(57) ABSTRACT

A retractable tarpaulin that can cover the cargo of truck, either partially or entirely. This system comprises a pair of posts that slide in notches at the periphery of a trailer flat bed, at the desired position according to the size of the cargo to cover. The width is also adjustable and includes an overhang of up to 12" on either side. The length may be reduced or extended at both front end and aft end if needed. The height of these posts can be adjusted to adapt to the cargo. A series of cables covers the distance from one post to the other to support the tarpaulin and a drum arrangement stretches the cables to provide tightness to support the tarpaulin. As the tarp is retracted a number of rings attached to the tarp are successively engaged in a cantilever hanger to keep the tarp in a small storage when not in use.

8 Claims, 9 Drawing Sheets

EASY TARP AND DRY LOAD

BACKGROUND OF THE INVENTION

1. Field of the Invention

This invention relates the field of retractable and adjustable tarpaulins, particularly those that cover the bedplate of a trailer.

2. Description of the Prior Art

Certain patents particularly drew our attention:

U.S. Pat. No. 5,690,377, Denyer, Nov. 25th, 1997, the box cannot be lowered and the tarpaulin covers only the top part of the load.

U.S. Pat. No. 5,524,953, Shaer, Jun. 11th, 1996, is a tarpaulin installed on arches, which slide along two rails. It cannot be adjusted for different heights.

U.S. Pat. No. 5,988,732, Schouten, Nov. 23rd, 1999, shows means of manuvering a tarpaulin but without varying the height or the length to be covered. The system uses several gears. It is heavy to handle and expensive to build.

U.S. Pat. No. 4,023,857, Killion, May 17th, 1977 shows a retractable tarpaulin. The frame of the box does not vary.

FR 64,559, Justinien, shows a permanent lattice, covered by a tarpaulin, which can be unfolded from the front to the rear. A tarpaulin, also present on both sides, folds around a roller 23. Neither the height, nor the length can be adjusted.

OBJECTS OF THE INVENTION

It is a general objective of the invention to provide a tarpaulin which can cover the cargo of trailers and is adaptable to various lengths, widths and heights. This tarpaulin should cover various cargos easily and securely. It should also be foldable into a small roll for storage. Its simple structure and light weight is to make it possible to cover a cargo entirely or in part. A more particular objective is to provide posts that are installed into notches in rails located at the periphery of the flat bed of a trailer. These posts are to be moved in accordance with the length of the cargo to cover. The length of these posts is to be adjustable to adapt to the height of the cargo. The end posts are linked together by cables to create a net that will support the tarpaulin.

BRIEF DESCRIPTION OF THE DRAWINGS

The present invention will be further understood from the following description with reference to the drawings in which.

DETAILED DESCRIPTION OF A PREFERRED EMBODIMENT

Figure 1:
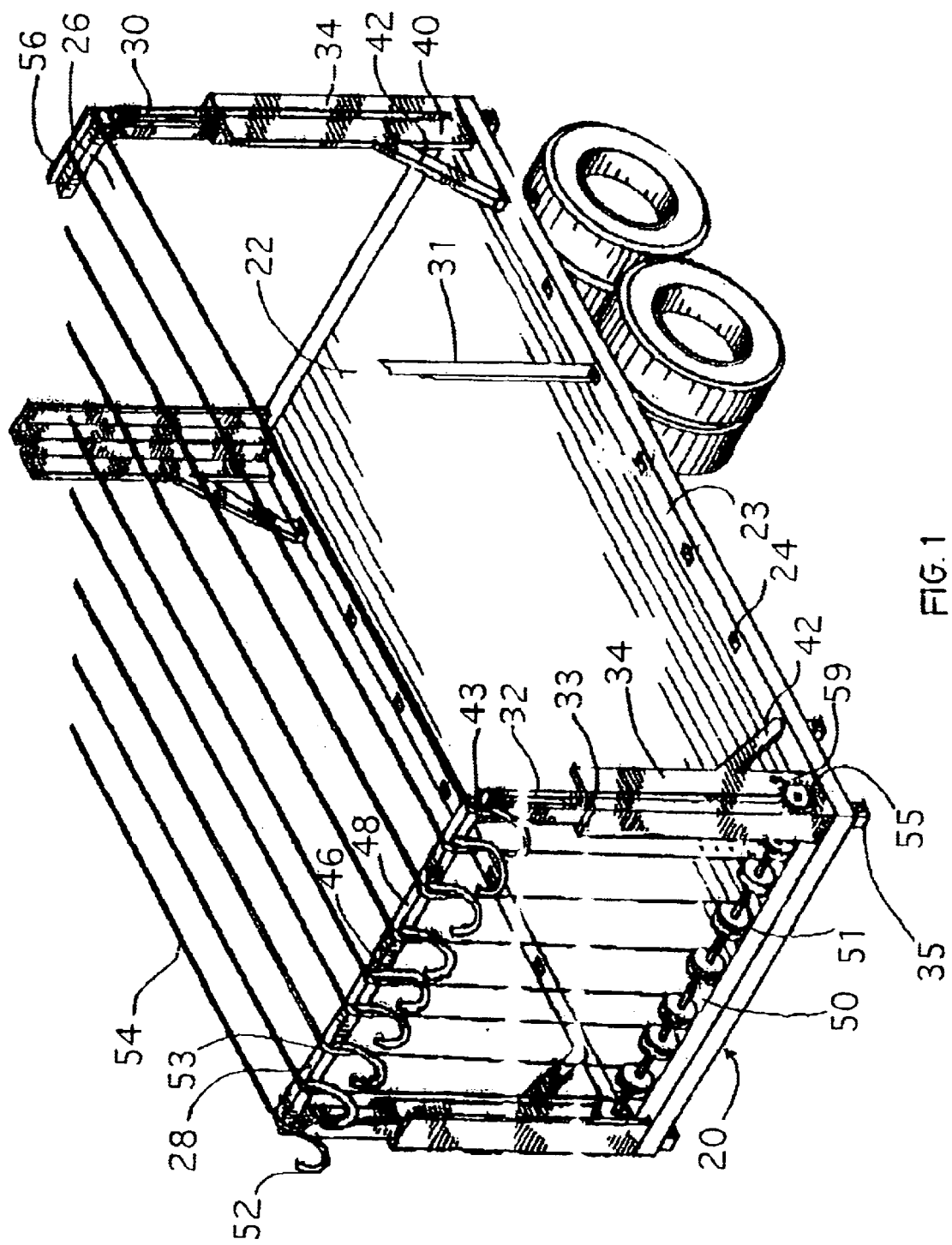
FIG. 1 is a perspective of a trailer, with posts, without the tarpaulin.

An embodiment of the invention is illustrated in the drawings wherein the same numbers identify the same characterizing elements.

FIG. 1 shows a flat bed 22 of a trailer 20 having a rail 23, at its sides. The rail 23 has notches 24, two feet apart from each other. At each end is a frame, front 28 and rear 26. Each frame comprises sliding posts 30, one on each side of the bed 22. The posts are made of tubes fitting in to one another. A series of small posts 31 are placed on both sides of the bed 22, at regular intervals along the rail 23, for example eight (8) feet apart. The sliding posts 30 are made of three tubes, making it possible to adjust their height for the cargo to be covered: that is an upper section 32, a middle extensible section 33—FIG.2—and a lower section 34. The rear frame 26 is similar to the front frame 28. The posts of the rear are also in several sections. An angular support rod 42 strengthens a wide flange 40 longitudinally and an extension 46 laterally connects a pair of upper cross bars 48, fixed on two end posts of the front. A transverse tube 50, supporting a number of barrels 51 joins together the lower sections 34 of the posts at the front. The barrels 51 receive cables 54. There is a cogwheel 55, at the end of the transverse tube 50, which reels in the cables until being locked in place by means of a clapper 59. Curved rods 52, attached to the upper cross bar 48 of the front post, are used to store the tarpaulin. There also is a series of small metallic tubes 53 attached to the upper cross bar 48. A series of cables 54 pass in these small tubes 53, the fore end thereof towards the barrels 51 and the aft end thereof being directed towards the posts at the rear. These cables are spaced approximately one (1) foot apart and then are gathered by a rake 56, at the rear end. These cables will support tarpaulin 57—FIG. 4.

Figure 2:
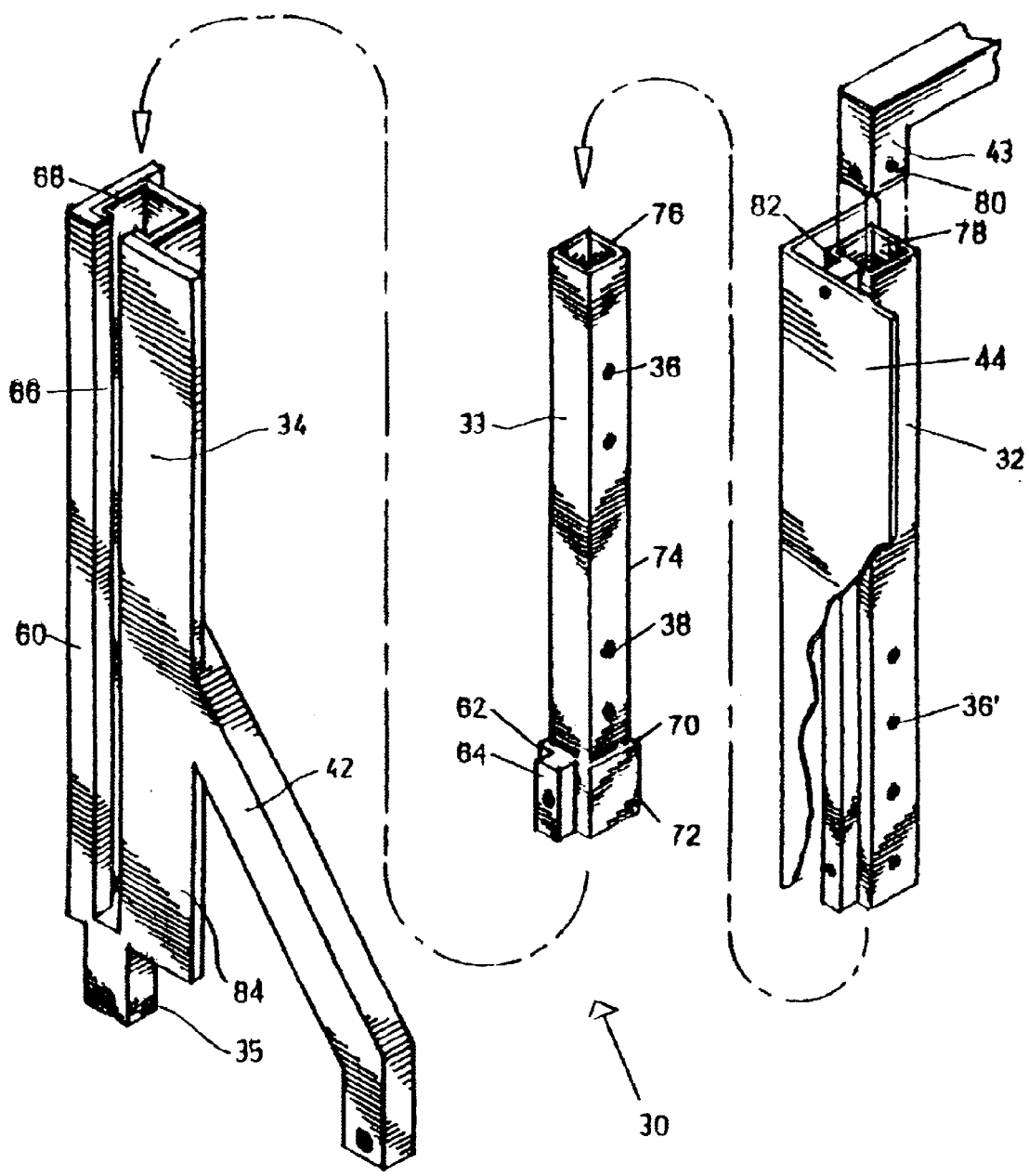
FIG. 2 is a perspective of a detail of FIG. 1.

FIG. 2 shows the three sections of the post arrow 30. The height of a post is adjusted with a series of holes 36, 36' and pins 38 locking together the sections 32, 33, 34 of the post. An extrusion 35 forms a flattened part to ease insertion of the post 34 into the notches. The support rod 42 solidifies every post and also allows moving the vertical structures towards the interior or the ends of the bed. An elbow 43 joins the upper section 32 to link it with the upper cross bar. The upper section 32 is covered with an outer flange 44. The sections are tubular and slip one over the other using slides 60. The middle section 33 comprises an excrescence 62, which has a lower groove 64. This groove 64 slides into a track 66 of the lower section 34. The interior of the lower section 34 is a female square 68 which can be, for example, of 75 mm by 75 mm in a typical trailer. The excrescence 62 forms a male square 70 of sides slightly smaller than those of the female square 68. The excrescence 62 has a long side 72 long enough to cover a good part of the length of the middle section 34. A length of 600 mm is usually sufficient. The upper section 33 has a hollow protrusion 74 whose outer square 76 is small enough to slide in the inner square 78 of the bottom of the upper section 32. The square 78 receives the bottom of the elbow 80, which slides into it. A top groove 82 has dimensions coinciding with those of the lower groove 64, which also slides along the track 66 of the slide 60 so that the upper section is completely hidden in the lower section if one wants to have a height of minimal load, that is approximately of 1500 mm. The outer flange 44 is attached, welded or screwed on the top groove 82. It collects the tarpaulin and is used as envelope. The outer flange 44 is on a rear post 30. The part of the outer flange 44 that is attached faces the outside of the trailer and the unattached part faces the rear or the front of the trailer, thereby forming a corner. The lower section uses a lower mantel 84 that is integrated with the support rod 42.

Figure 3:
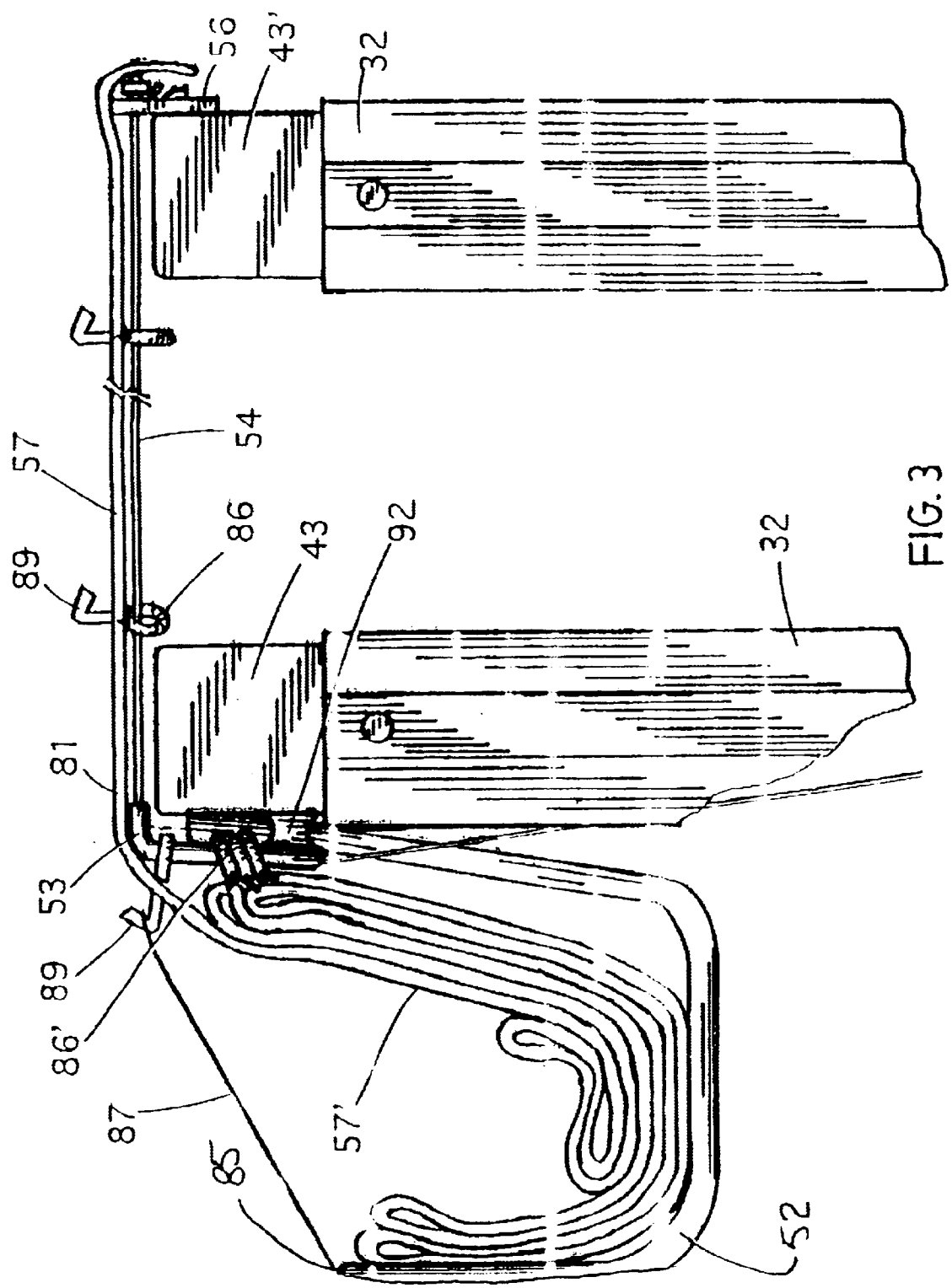
FIG. 3 shows a detail of the system of FIG. 1.

FIG. 3 illustrates two upper sections 32, 32' of two posts, a rear one and a front one. A curved rod 52 supports a folded tarpaulin 57. A small tube 53 is fixed to a first elbow 43 by means of retention peg 92 welded to the first elbow 43 at its bottom. A cable 54 passes through the small tube 53 and joins a rack 56 mounted onto a rear elbow 43'. The small tube 53 is maintained a certain distance apart from the top of the elbow 43 and along the vertical part thereof. This is to leave a gap 81 that is large enough to permit horizontal rings 86 to slide around the small tube while carrying the tarpaulin as far as vertical rings 86'. Each cable 54 is tightened horizontally to support the top tarpaulin 57 by means of the rings 86. The cables 54 are attached to a rake 56 that locks itself against the upper-cross bar 48. A folded tarpaulin 57' is resting against curved rods 52. The rod end 85 of the curved rod 52 holds an elastic band 87 that is placed by operators onto an outside hook 89 mounted on the tarpaulin and guided to stretch the tarpaulin. The hook 89 is connected across from a ring 86 to provide rigidity.

Figure 4:
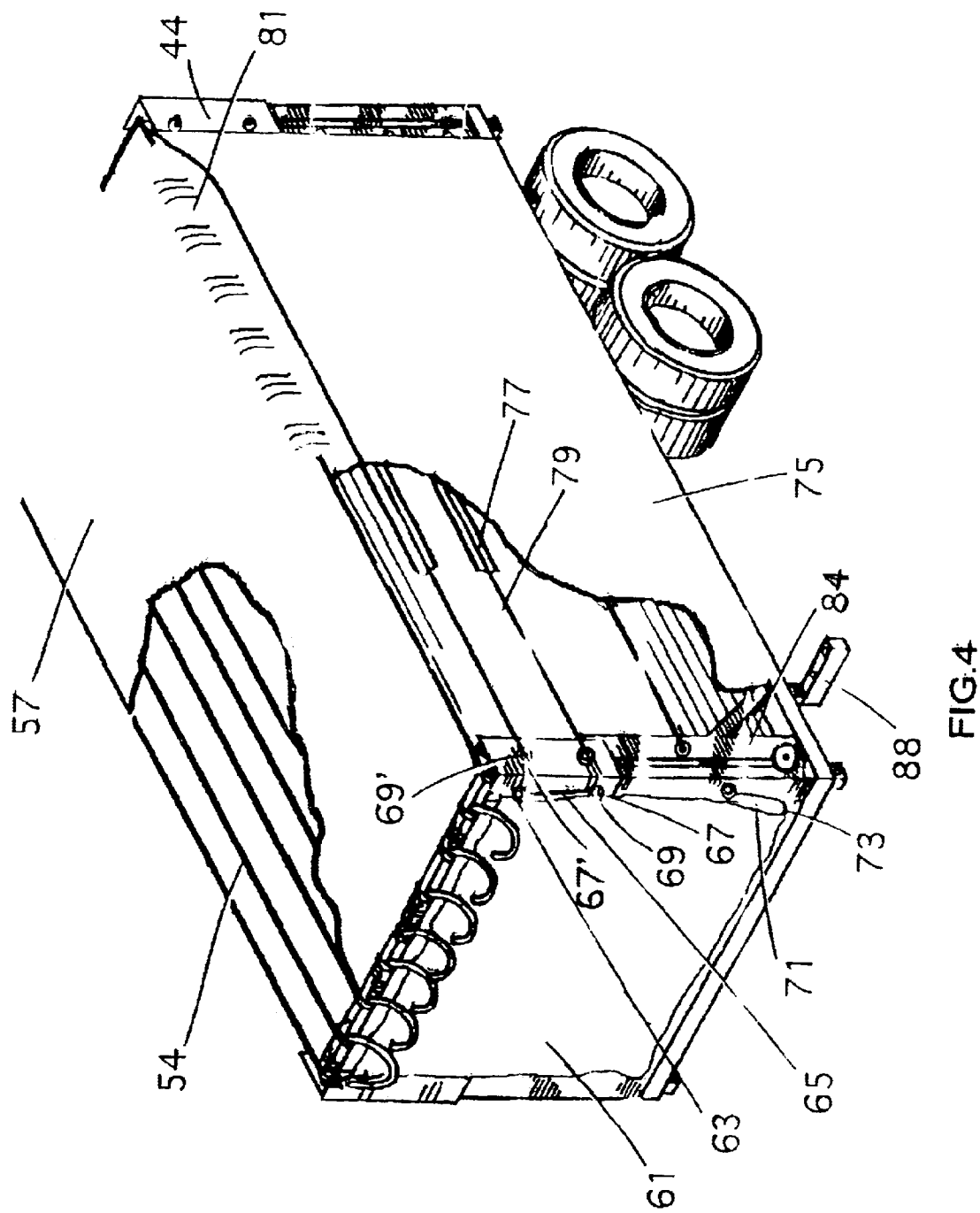
FIG. 4 is a perspective of a trailer, with the tarpaulin.

FIG. 4 shows the trailer with a top tarpaulin 57 unfolded at the front. The tarpaulin is made of four parts, that is two side tarpaulins 75, one front tarpaulin 61 and one top tarpaulin 57. The tarpaulin comprises eyelets 63 located on the side. There can be one row of eyelets 63 at about one foot from the end, thus allowing increasing the width of a load. A string passes through a series of eyelets. Buttons 69, 69' are present on the outer flange 44. Snap hooks 67, 67' are enclosed around the buttons 69 and receive a string 65. The string 65 is located at the front of the trailer to keep its tarpaulin under tension. If one pulls the string 65 downwards, the tension of the tarpaulin will be increased and thus its waterproofness improves. The lower part 71 of the tarpaulin 57 may be increased in length if needed to cover the load. An inner fold 73 enhances the waterproofness. Other buttons 69' are on the outer flange 44 and on the lower mantel 84 to stretch the side tarpaulins 75. The side tarpaulins comprise a number of sleeves 77 encasing the cable 79. These sleeves are disposed about one foot apart. To better the tension, the cables are attached to the snap hooks 67. The cables 54 support the top tarpaulin 57. The top tarpaulin, when unfolded, covers the higher part of the side tarpaulins 75. The rake 56 is used to draw the tarpaulin towards the rear of the bed, until it is tightened longitudinally and attached to the rear frame 26. An extension bar 88 is provided to permit increasing the useful width by up to one foot on either side of the trailer. Each post 30 is then positioned over and into the end of the extension bar.

Figure 5:
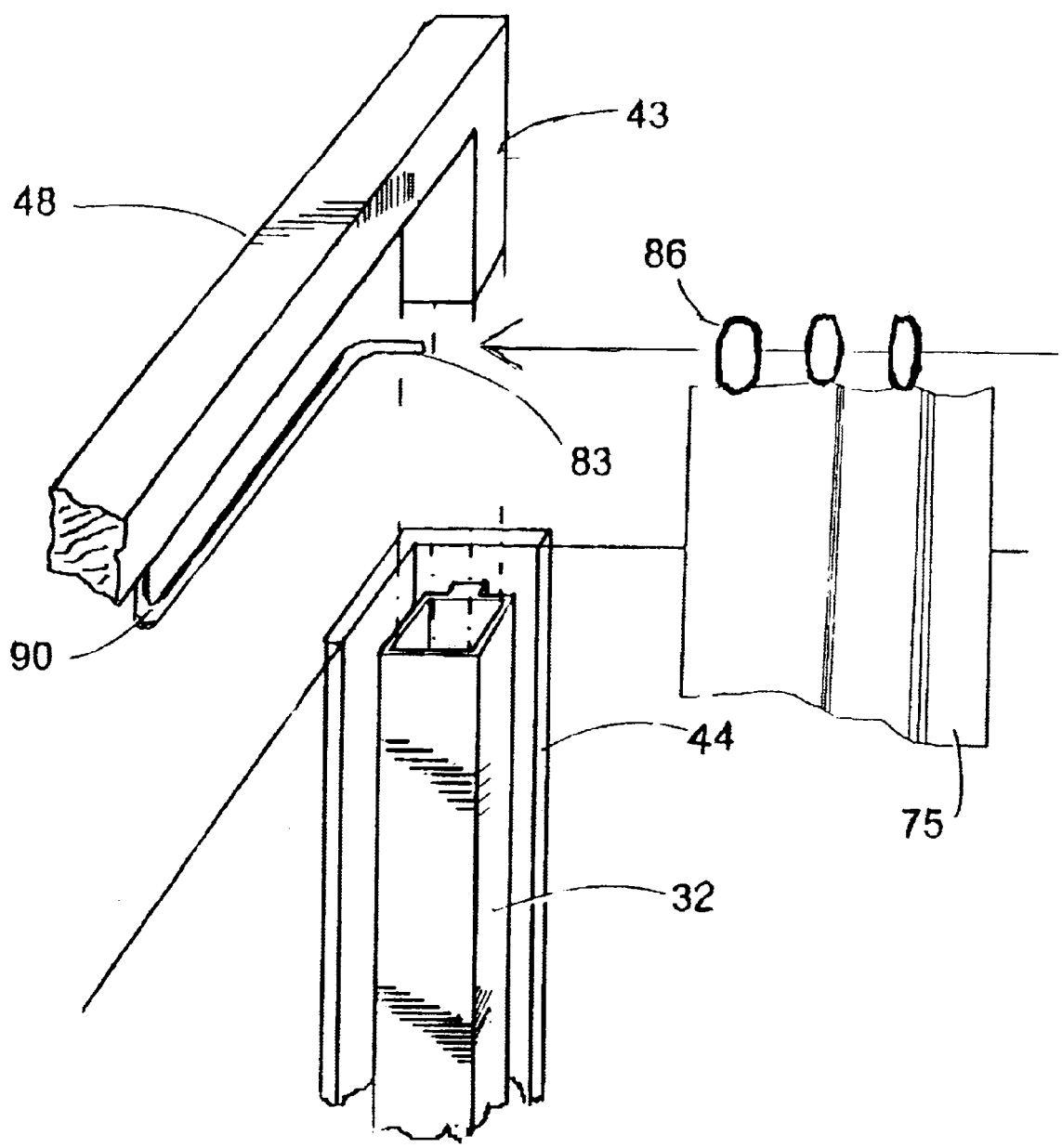
FIG. 5 shows a detail of the retraction of the tarpaulin of FIG. 4.

FIG. 5 shows an enlarged end view of a side tarpaulin 75, ready to be folded. A horizontal support 83 allows the rings 86 which support the tarpaulin to be received along the horizontal support and be crowded along that support while carrying the tarp: as a result the tarp is being folded at the front end because the rings 86 act as curtain rings along the horizontal support 83. One end 90 of the support must be held against the cross bar 48 to retain the tarpaulin while it is folding completely. The support 90 end may be welded to the cross bar 48.

Figure 6:
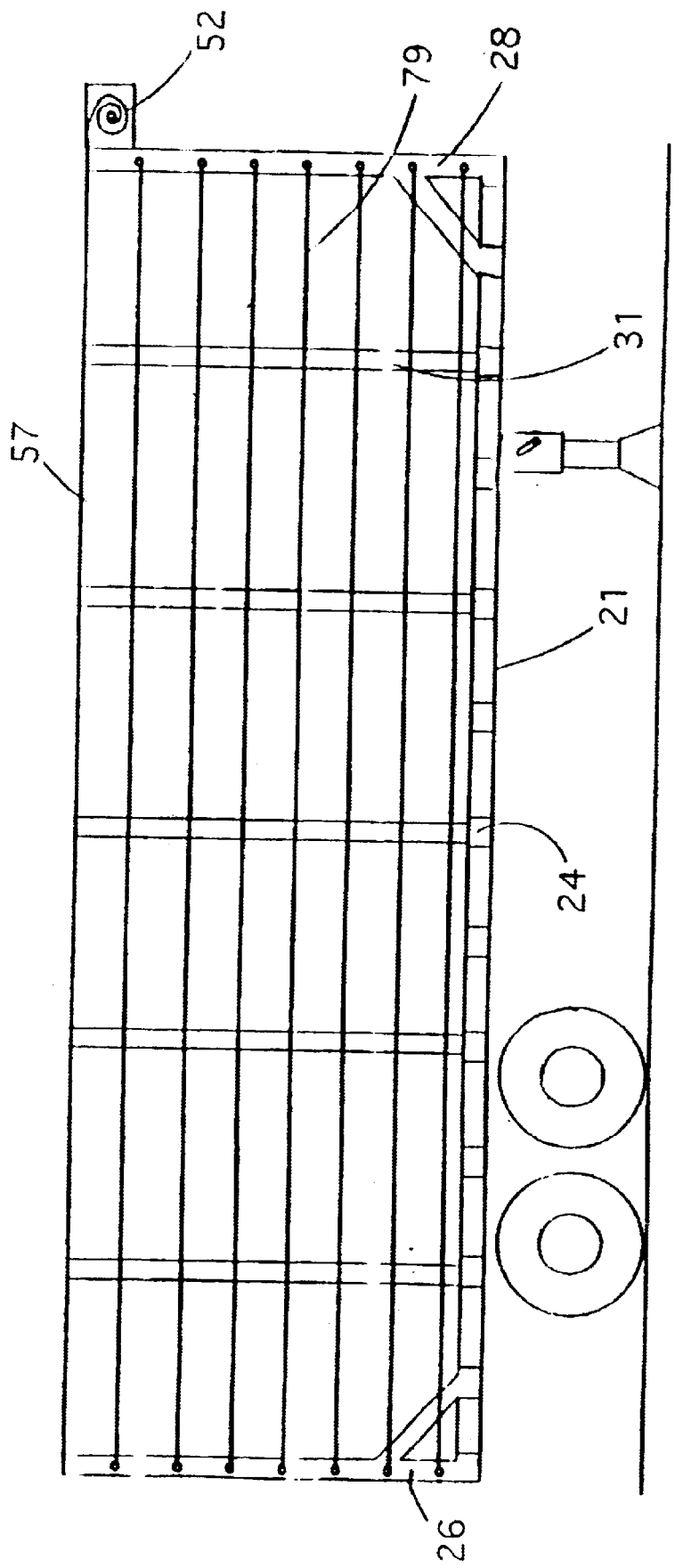
FIG. 6 is a side view of a flat bed.

FIG. 6 shows trailer equipped with small posts 31 mounted in notches 24 of a flat bed 21 and supporting a series of cables 79 attached to a mobile front frame 28 and to a mobile rear frame 26. At the front is a curved rod 52, which serves as housing for storage of the tarpaulin.

Figure 7:
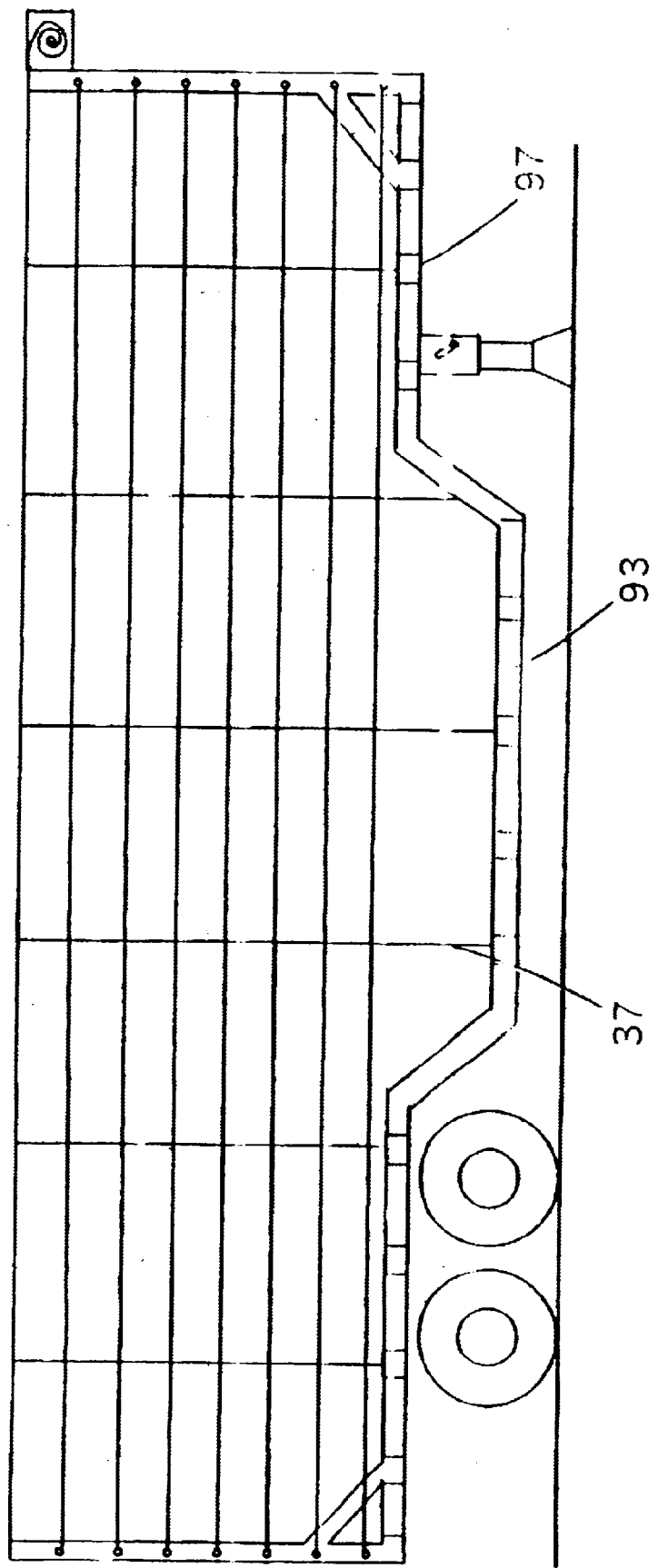
FIG. 7 is a side view of a double deck trailer.

FIG. 7 shows the application of FIG.6 but on a different type of trailer, namely a double drop 97, wherein small posts are extended posts 37 to account for a lower centre section 93. The bottom of the tarpaulin must be adjusted accordingly.

Figure 8:
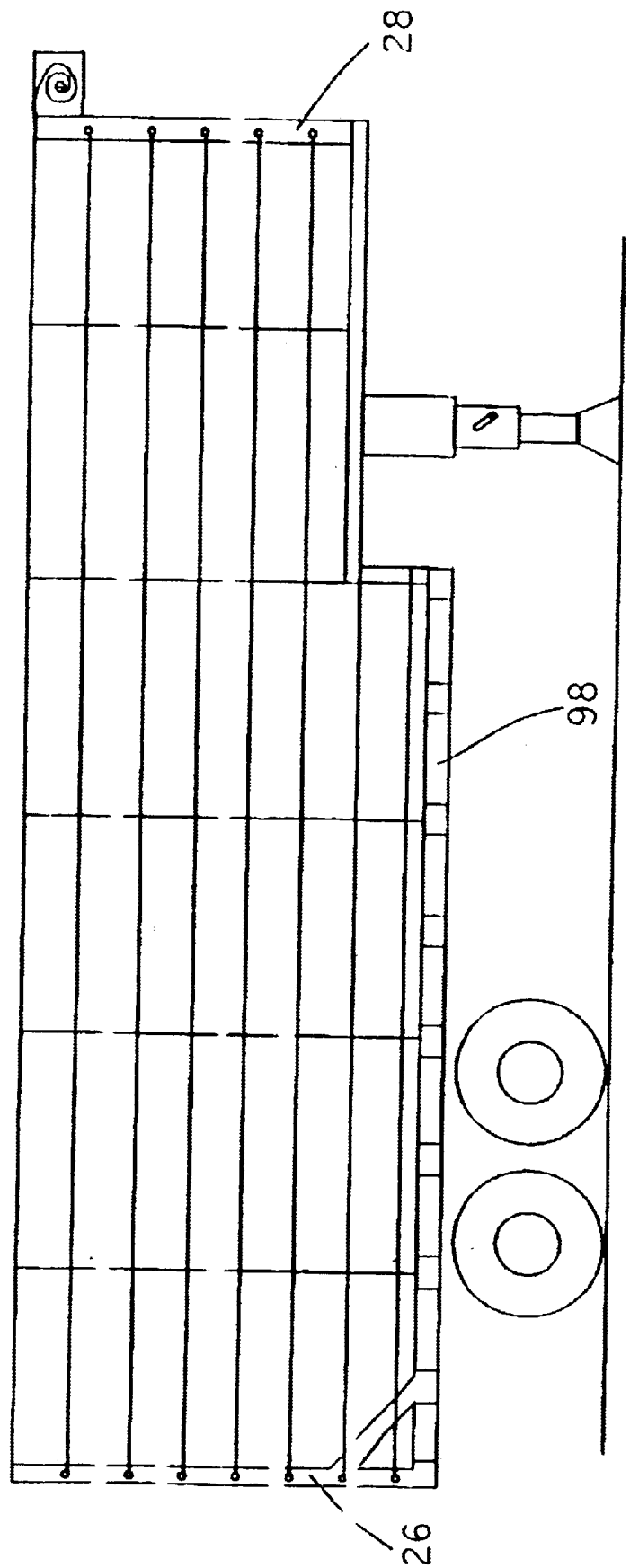
FIG. 8 is a side view of a drop deck trailer.

FIG. 8 shows an application on a single drop deck 98. The front frame 28 is less extended than the rear frame 26.

Figure 9:
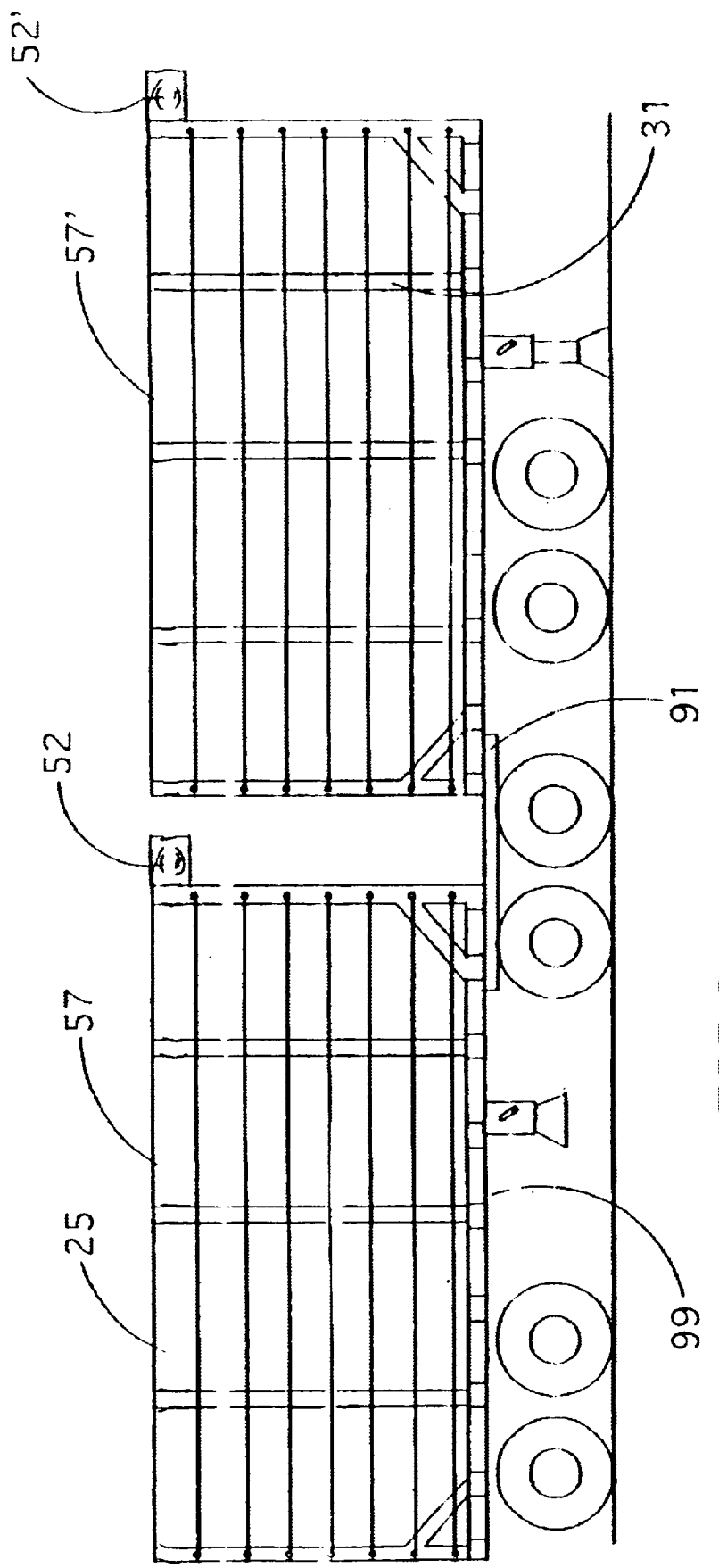
FIG. 9 is a side view of a set of two trailers.

FIG. 9 shows a double trailer 99, which comprises two small trailers 25, coupled by a coupling 91, one behind the other. Each unit is equipped with its own tarpaulin handling equipment; each tarpaulin when not in use is reeled in its storage area. The top tarpaulins 57, 57' are reeled around their curved rods 52, 52'.

Other Embodiments

The posts 30 may be of U-shaped section with an indentation facing the outer side of the bed. The U-shaped section would also comprise inner grooves to hold the outer flange 44. The lower section of a front post comprises a catch for a cogwheel, making it possible to reel in the cable. A lever activates the cogwheel. A clapper, screwed on the post, locks the return of the teeth. The cable that comes out of the cogwheel, moves along the indentation of the front post and passes by a small tube to the upper section of the post.

Additional sections may be added to place post 30 beyond the limits of the bed, either lengthwise or widthwise.

It is clearly understood that the mode of realization of this invention which was described above, in reference to the annexed drawings, was given as an indication and is by no means restrictive, and further modifications and adaptations can be achieved without the object deviating from the scope this invention.

Other embodiments are possible and limited only by the scope of the appended claims:

Parts 20 trailer
22 bed
23 rail
24 notches
26 rear frame
28 front frame
30 post
31 small post
32 upper section
33 middle section
34 lower section
35 extrusion
36 hole
38 pins
40 wide flange
42 support rod
43 top elbow
44 outer flange
46 extension
48 cross bar
50 transverse tube
51 barrel
52 curved rod
53 small tube
54 cable
55 cogwheel
56 rake
57 top tarpaulin
59 clapper
60 slide
61 front tarpaulin
62 excrescence
63 eyelet
64 groove
65 string
66 track
67 hook 68 square
69 groove
70 square
71 lower part
72 long side
73 inner fold
74 protrusion
75 side tarpaulin
76 outer square
77 sleeve
78 inner quare
79 cable
81 top tarpaulin
80 top of elbow
82 top groove
83 horizontal support
84 lower mantel
85 end of the rod
86 ring
87 elastic band
88 side tarpaulin
89 hook
90 end arm
92 retention peg
93 gap
97 double drop
98 drop deck
99 double trailer

I claim:

1. A tarpaulin supporting structure to cover a cargo of a trailer (20) comprising a bed (22) and rails (23) having notches (24) placed at the periphery of said bed (22), said structure comprising:

two pairs of posts (30) comprising means to be mounted firmly and temporarily along said rails (23) to provide a desired length of coverage;

each of said posts being extensible in height and comprising means for extension;

means for connecting, at the ends, a pair of said posts to form bridges laterally, thereby defining a rear frame (26) and a front frame (28);

a number of longitudinally extending tarpaulin supporting cables, means to mount said cables between said posts and means to tighten said cables to secure said tarpaulin, means for extending and retrieving said cables along with said tarpaulin and means to store said tarpaulin when not in use and to set said tarp in position over a load lengthwise, widthwise and heightwise, when used.

2. The tarpaulin supporting structure of claim 1 wherein said posts comprise a number of intermediary posts (31) installed in said notches (24) longitudinally and said means for extension comprise a lower section (34), a centre section (33) and an upper section (32), said lower section comprising means to firmly sit (35) in said notches and bracing means (42) to prevent longitudinal collapse when said tarpaulin is being loaded and tightened in place, said lower section further comprising receiving means (68) to receive a pedestal (62) of superior posts and means to guide said pedestal in said receiving means, said centre section (33) comprising at a lower end said pedestal over which sits a structural part, the section dimensions thereof falling short of section dimensions of said pedestal thereby permitting the insertion of a tubular upper section (32) between said structural part and the projection limits of said pedestal, thereby permitting continuous contact between said three sections during rise and extension, while permitting complete hiding of said centre section and said upper section within the confines of said lower section when minimum height is required.

3. The structure of claim 2 wherein said tarpaulin comprises a side tarpaulin (75) mounted on horizontal cables (79) and supported by a top horizontal support (83) by means of rings (86) to slide onto an extension arm (90) for storage when not in use.

4. The structure of claim 2 wherein said tarpaulin comprises a top tarpaulin (57) comprising sleeves for passing cables (54), said cables being attached to said rear frame and to said front frame, said cables (54) comprising means to tighten and support said tarpaulin between said rear and front frames and to retract said top tarpaulin to a storage location.

5. The structure of claim 4 wherein said front frame (28) comprises at the top a cross bar (48), with a number of small tubes adapted on the front face by means of a retention peg (92) located at their bottom part, the other parts being maintained a certain distance away from said cross bar and said means to tighten comprise a barrel (51) placed at the bottom of said front frame (28) said barrel (51) tightening said cables (54) and said top tarpaulin (57) comprising rings (86) which engage said small tube in said gap (93) as far, as the retention peg (92).

6. The structure of claim 4 further comprising means for storing a top tarpaulin when not in use, comprising a curved rod (52) which receives part of said top tarpaulin (57) corresponding with said rings (86) stored in said small tubes (53).

7. The structure of claim 6 further comprising an elastic band (87) to maintain tension of tarpaulin, said elastic band being applied against hooks (89) mounted across from said rings (86) to provide tension to retain said tarpaulin within a storage housing.

8. The structure of claim 2 wherein said lower section (34) is a square tube (68) and comprises a track (66) to let pass a top groove (82) with an outer group flange (44) in said upper section (32), the middle section (33) possessing a groove (64) to guide said upper section (32) extending over the middle section (33) as far as a square (70) to disappear when fully retracted.

* * * * *